United States Patent
Okuda et al.

(10) Patent No.: US 9,074,343 B2
(45) Date of Patent: Jul. 7, 2015

(54) WORK VEHICLE

(71) Applicant: KOMATSU LTD., Tokyo (JP)

(72) Inventors: Kozo Okuda, Hirakata (JP); Tsuyoshi Kobayashi, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/236,672

(22) PCT Filed: Sep. 25, 2013

(86) PCT No.: PCT/JP2013/075836
§ 371 (c)(1),
(2) Date: Feb. 3, 2014

(87) PCT Pub. No.: WO2015/045022
PCT Pub. Date: Apr. 2, 2015

(65) Prior Publication Data
US 2015/0086314 A1 Mar. 26, 2015

(51) Int. Cl.
*B60K 13/04* (2006.01)
*E02F 9/08* (2006.01)
*E02F 3/30* (2006.01)

(52) U.S. Cl.
CPC .............. *E02F 9/0866* (2013.01); *E02F 3/30* (2013.01); *E02F 9/0891* (2013.01)

(58) Field of Classification Search
CPC ....... B60K 11/04; B60K 13/04; E02F 9/0866; F01N 2590/08; F01N 3/2066
USPC .......................... 180/68.3, 296, 305, 306, 309
See application file for complete search history.

(56) References Cited

U.S. PATENT DOCUMENTS

| 7,537,072 B2 * | 5/2009 | Sturmon et al. ............ 180/68.1 |
| 8,899,017 B2 * | 12/2014 | Himoto et al. ................ 60/282 |
| 8,931,585 B2 * | 1/2015 | Sakai et al. .................. 180/291 |
| 8,936,128 B2 * | 1/2015 | Numa ........................ 180/69.25 |

(Continued)

FOREIGN PATENT DOCUMENTS

| CN | 101571059 A | 11/2009 |
| JP | 2012-240518 A | 12/2012 |

(Continued)

OTHER PUBLICATIONS

The International Search Report for the corresponding international application No. PCT/JP2013/075836, issued on Dec. 17, 2013.

(Continued)

*Primary Examiner* — Brodie Follman
(74) *Attorney, Agent, or Firm* — Global IP Counselors, LLP

(57) ABSTRACT

A working vehicle includes a vehicle, an engine, an exhaust treatment apparatus, a connecting pipe, a reducing agent injection apparatus, a reducing agent pump and a guiding pipe guiding reducing agent from the pump to the injection apparatus. The engine, exhaust treatment apparatus, connecting pipe, and reducing agent injection apparatus are arranged inside an engine room of the vehicle body. The engine has a crank shaft, and intake and exhaust manifolds arranged on first and second direction sides of the crank shaft, respectively. A first accommodating space is positioned on a first direction side of the engine room. A reducing agent pump is arranged inside the first accommodating space. A guiding pipe is arranged so as to pass inside the engine room on the first direction side with regard to the crank shaft.

14 Claims, 4 Drawing Sheets

(56) References Cited

U.S. PATENT DOCUMENTS

| | | |
|---|---|---|
| 8,950,535 B2 * | 2/2015 | Harada et al. ............ 180/68.4 |
| 2010/0319321 A1 * | 12/2010 | Kamiya et al. ............ 60/285 |
| 2011/0173962 A1 * | 7/2011 | Miwa et al. ............ 60/311 |
| 2013/0343853 A1 * | 12/2013 | Sato et al. ............ 414/719 |
| 2014/0190577 A1 * | 7/2014 | Yamamoto ............ 137/351 |
| 2014/0246262 A1 * | 9/2014 | Mori et al. ............ 180/309 |
| 2014/0262589 A1 * | 9/2014 | Sakamoto ............ 180/309 |
| 2014/0305110 A1 * | 10/2014 | Himoto et al. ............ 60/324 |
| 2014/0326527 A1 * | 11/2014 | Harada et al. ............ 180/309 |
| 2015/0000256 A1 * | 1/2015 | Kobayashi et al. ............ 60/282 |
| 2015/0027800 A1 * | 1/2015 | Himoto et al. ............ 180/296 |

FOREIGN PATENT DOCUMENTS

| | | |
|---|---|---|
| JP | 2013-87698 A | 5/2013 |
| JP | 2013-181400 A | 9/2013 |

OTHER PUBLICATIONS

The Office Action for the corresponding Chinese patent application No. 201380002448.0, issued on May 20, 2015.

* cited by examiner

WORK VEHICLE

CROSS-REFERENCE TO RELATED APPLICATIONS

This application is a U.S. National stage application of International Application No. PCT/JP2013/075836, filed on Sep. 25, 2013.

BACKGROUND

1. Field of the Invention

The present invention relates to a work vehicle.

2. Background Information

An exhaust treatment apparatus for treating exhaust from an engine is mounted in a work vehicle. A connecting pipe which conducts exhaust from the engine to the exhaust treatment apparatus is connected with the exhaust treatment apparatus and a reducing agent injection apparatus is attached to the connecting pipe. The reducing agent injection apparatus injects a reducing agent such as aqueous urea inside the connecting pipe. The exhaust treatment apparatus reduces nitrogen oxide (NOx) in the exhaust using the reducing agent.

The work vehicle is provided with a reducing agent pump for supplying a reducing agent to the reducing agent injection apparatus. A reducing agent pump is connected with the reducing agent injection apparatus using a guiding pipe and supplies the reducing agent to the reducing agent injection apparatus via the guiding pipe (for example, refer to Japan Patent Laid-open Patent Publication JP-A-2012-240518).

SUMMARY

Since the decomposition of the reducing agent proceeds more quickly as the temperature increases, it is preferable for the reducing agent pump to be arranged to avoid an environment where the temperature is excessively high. Since an engine room where the engine is arranged is a high temperature due to heat from the engine, it is preferable for the reducing agent pump to be arranged outside the engine room.

However, even when the reducing agent pump is arranged outside the engine room, a portion of the guiding pipe which is connected with the reducing agent injection apparatus is arranged inside the engine room. As a result, the effect of heat on the reducing agent inside the guiding pipe due to heat from the engine room is a concern. In particular, since the reducing agent flows inside the guiding pipe at an extremely low flow rate of approximately several centimeters per second, the effect of heat on the reducing agent inside the guiding pipe increases as the guiding pipe inside the engine room is lengthened.

An object of the present invention is to provide a working vehicle where it is possible to reduce the effect of heat on reducing agent inside a guiding pipe.

A work vehicle is provided with a vehicle body, an engine, an exhaust treatment apparatus, a connecting pipe, a reducing agent injection apparatus, a reducing agent pump, and a guiding pipe. The vehicle body has an engine room and a first accommodating space which is partitioned from the engine room. The engine has a crank shaft, an intake manifold, and an exhaust manifold. The intake manifold is arranged on a first direction side which is one side in a direction which is perpendicular to a longitudinal direction of the crank shaft. The exhaust manifold is arranged on a second direction side which is the other side in a direction which is perpendicular to a longitudinal direction of the crank shaft. The exhaust treatment apparatus cleans exhaust from the engine using a reducing agent. The connecting pipe is connected with the exhaust treatment apparatus and conducts exhaust from the engine to the exhaust treatment apparatus. The reducing agent injection apparatus is arranged on the first direction side with regard to the crank shaft and injects the reducing agent inside the connecting pipe. The reducing agent pump discharges the reducing agent. The guiding pipe guides the reducing agent from the reducing agent pump to the reducing agent injection apparatus. The engine and the reducing agent injection apparatus are arranged inside the engine room. The first accommodating space is positioned on the first direction side of the engine room. The reducing agent pump is arranged inside the first accommodating space. The guiding pipe is arranged so as to pass inside the engine room on the first direction side with regard to the crank shaft.

In this case, the reducing agent injection apparatus is arranged on the first direction side with regard to the crank shaft and the reducing agent pump is arranged inside the first accommodating space which is positioned on the first direction side with regard to the engine room. As a result, it is possible to shorten the guiding pipe which connects the reducing agent injection apparatus and the reducing agent pump. Due to this, it is possible to reduce the effect of heat on the reducing agent inside the guiding pipe. In addition, the temperature of a space inside the engine room on the first direction side, that is, a space on the intake side is lower than the temperature of a space on the second direction side, that is, the space on the exhaust side. As a result, by the guiding pipe being arranged so as to pass inside the engine room on the intake side with regard to the crank shaft, it is possible to further reduce the effect of heat on the reducing agent inside the guiding pipe.

It is preferable for the work vehicle to be further provided with a hydraulic pump, a work implement, a control valve, and a partition wall. The hydraulic pump is driven by the engine. The work implement is driven by hydraulic fluid which is discharged from the hydraulic pump. The control valve controls the hydraulic fluid which is supplied to the work implement. The partition wall partitions a second accommodating space, which is arranged on the first direction side with regard to the engine room, and the engine room. The control valve is arranged inside the second accommodating space. The guiding pipe is arranged so as to pass inside the engine room between the partition wall and the engine.

In this case, the partition wall is arranged between the control valve and the guiding pipe. As a result, it is possible to reduce the effect of heat on the reducing agent inside the guiding pipe due to the control valve which is a higher temperature than the space inside the engine room on the intake side.

It is preferable for the control valve to be arranged between the reducing agent pump and the reducing agent injection apparatus in a direction which is parallel with the longitudinal direction of the crank shaft. In this case, it is possible to reduce the effect of heat on the reducing agent inside the guiding pipe due to the partition wall even while the guiding pipe is arranged so as to pass close to the control valve.

It is preferable for the vehicle body to have an engine hood and a frame member. The engine hood is configured to be opened and closed an opening positioned above the engine room. The frame member supports an end portion of the engine hood. The frame member has a bracket which holds the guiding pipe.

In this case, it is possible to suppress the guiding pipe from becoming an obstacle when accessing the inside of the engine room via the opening for maintenance. In addition, since it is possible to easily access the guiding pipe via the opening, the ease of maintaining the guiding pipe is improved.

It is preferable for the work vehicle to be further provided with a main frame section. The main frame section is arranged below the engine and supports the engine. The main frame section has a left main frame and a right main frame. The left main frame and the right main frame are each arranged so as to extend in the front and back direction. The crank shaft is arranged so as to extend in the vehicle width direction. The reducing agent pump is arranged on one lateral side of the main frame section and the reducing agent injection apparatus is arranged on the other lateral side of the main frame section.

In this case, the length of the guiding pipe becomes long since the distance between the reducing agent pump and the reducing agent injection apparatus is long, but it is possible to reduce the effect of heat on the reducing agent inside the guiding pipe by the guiding pipe being arranged so as to pass through a space inside the engine room on the intake side.

It is preferable for the guiding pipe to be arranged so as to pass above the left main frame and the right main frame. The lowest portion of the guiding pipe between the left main frame and the right main frame is positioned above the left main frame and the right main frame.

In this case, since the heights of the left and right main frames do not easily become obstacles in the layout of the guiding pipe, it is possible to easily realize a layout of the guiding pipe with little bending. Due to this, it is possible to reduce the reducing agent which remains inside the guiding pipe when the reducing agent pump is stopped.

According to the present invention, it is possible to provide a work vehicle where it is possible to reduce the effect of heat on a reducing agent inside a guiding pipe.

DETAILED DESCRIPTION OF EMBODIMENT(S)

Figure 1:
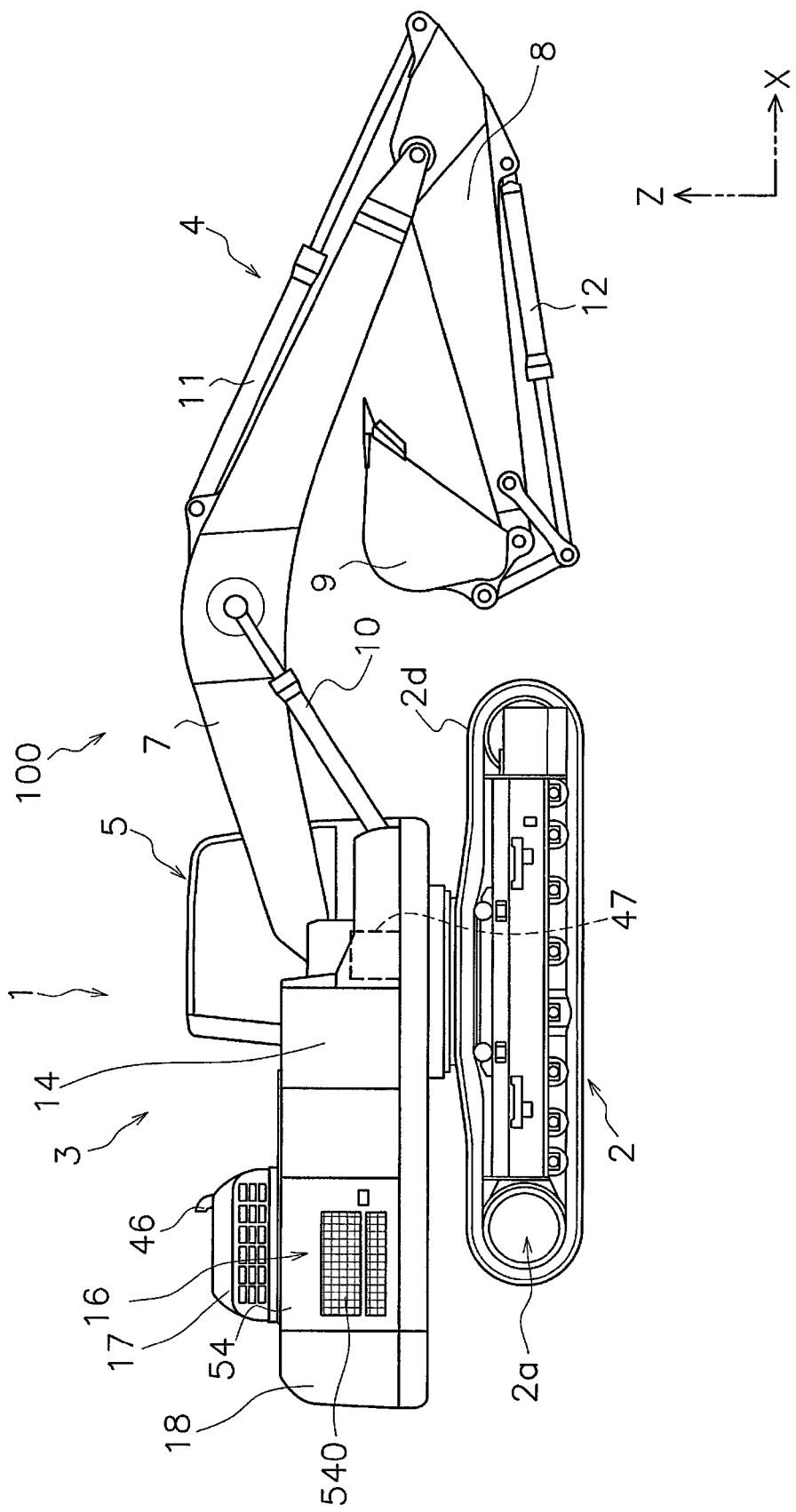
FIG. 1 is a side view of a work vehicle according to an embodiment.
Figure 2:
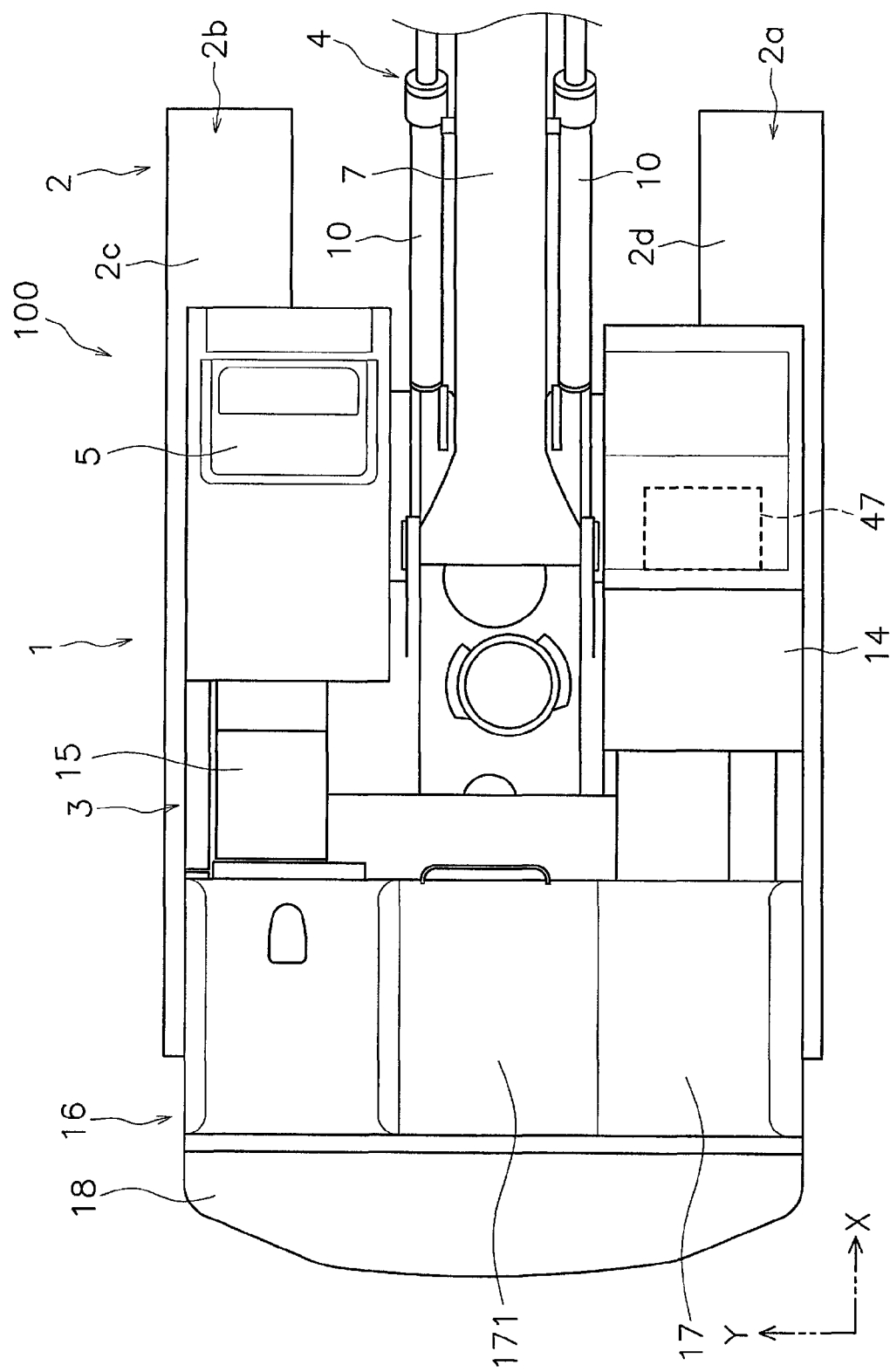
FIG. 2 is a planar view of the work vehicle.

Below, a work vehicle 100 according to an embodiment of the present invention will be described with reference to the diagrams. FIG. 1 is a side view of the work vehicle 100. FIG. 2 is a planar view of the work vehicle 100. The work vehicle 100 according to the present embodiment is a hydraulic excavator. As shown in FIG. 1 and FIG. 2, the work vehicle 100 is provided with a vehicle body 1 and a work implement 4.

The vehicle body 1 has a traveling unit 2 and a revolving unit 3. As shown in FIG. 2, the traveling unit 2 has a pair of traveling apparatuses 2a and 2b. The traveling apparatus 2a has a crawler track 2d. The traveling apparatus 2b has a crawler track 2c. The work vehicle 100 moves due to the traveling apparatuses 2a and 2b driving the crawler tracks 2c and 2d using driving force from an engine 21 (refer to FIG. 3) which will be described later.

Here, in the following description, the front and back direction has the meaning of the front and back direction of the vehicle body 1. In other words, the front and back direction is the direction to the front and back viewed from an operator who is seated in a cab 5. In addition, the left and right direction or the lateral direction has the meaning of the vehicle width direction of the vehicle body 1. In other words, the left and right direction, the vehicle width direction, or the lateral direction is the direction to the left and right viewed from the operator described above. In addition, the front and back direction is shown by the X axis, the left and right direction is shown by the Y axis, and the up and down direction is shown by the Z axis in the diagrams.

The revolving unit 3 is mounted on the traveling unit 2. The revolving unit 3 is configured to revolve with regard to the traveling unit 2. In addition, the cab 5 is provided in the revolving unit 3. The revolving unit 3 has a fuel tank 14, a hydraulic fluid tank 15, an engine room 16, and a counter weight 18. The fuel tank 14 retains fuel for driving the engine 21 which will be described later. The hydraulic fluid tank 15 retains hydraulic fluid which is discharged from a hydraulic pump 23 (refer to FIG. 3) which will be described later. The fuel tank 14 is arranged at one lateral side (the right side in the present embodiment) with regard to the center of the revolving unit 3 in the vehicle width direction and the hydraulic fluid tank 15 is arranged at the other lateral side (the left side in the present embodiment) with regard to the center of the revolving unit 3 in the vehicle width direction. The hydraulic fluid tank 15 is arranged behind the cab 5.

The engine room 16 accommodates equipment such as the engine 21 and the hydraulic pump 23 which will be described later. The engine room 16 is arranged behind the cab 5, the fuel tank 14, and the hydraulic fluid tank 15. An engine hood 17 is arranged above the engine room 16. The counter weight 18 is arranged behind the engine room 16.

The work implement 4 is attached to a front section of the revolving unit 3. The work implement 4 has a boom 7, an arm 8, a bucket 9, a boom cylinder 10, an arm cylinder 11, and a bucket cylinder 12. A base end portion of the boom 7 is rotatably joined to the revolving unit 3. In addition, a base end portion of the arm 8 is rotatably joined to a front end portion of the boom 7. The bucket 9 is rotatably joined to a front end portion of the arm 8. The boom cylinder 10, the arm cylinder 11, and the bucket cylinder 12 are hydraulic cylinders and are driven by hydraulic fluid which is discharged from the hydraulic pump 23 which will be described later. The boom cylinder 10 operates the boom 7. The arm cylinder 11 operates the arm 8. The bucket cylinder 12 operates the bucket 9. The work implement 4 is driven by the cylinders 10, 11, and 12 being driven.

Figure 3:
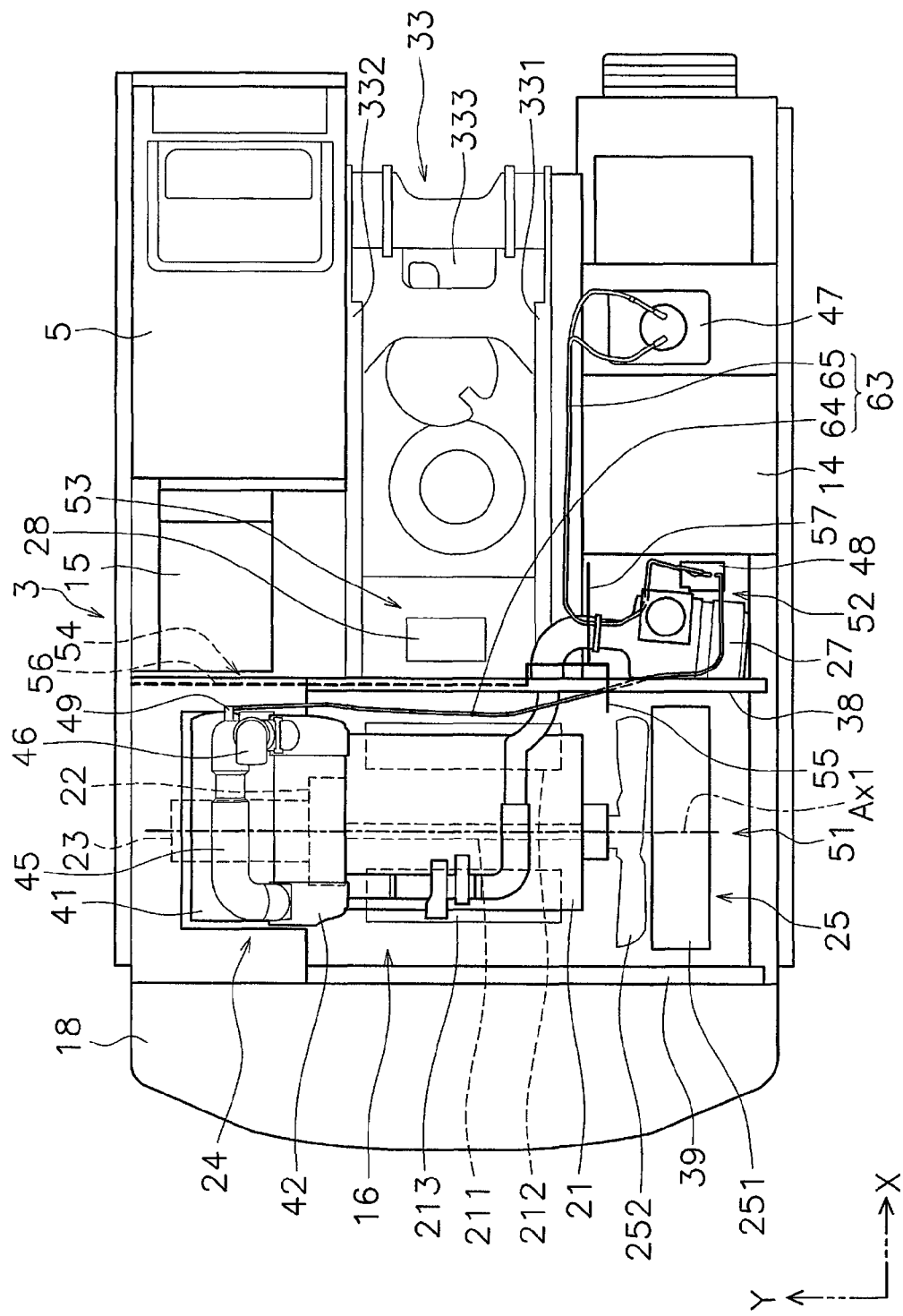
FIG. 3 is a planar view of an inner configuration of the work vehicle.

FIG. 3 is a planar view of the inner configuration of the work vehicle 100. As shown in FIG. 3, the vehicle body 1 includes the engine room 16, a ventilation space 51, a first accommodating space 52, and a second accommodating space 53. The engine 21, a flywheel housing 22, the hydraulic pump 23, and an exhaust treatment apparatus 24 are arranged in the engine room 16. The engine 21 has a crank shaft 211, an intake manifold 212, and an exhaust manifold 213.

The crank shaft 211 is arranged so as to extend in the vehicle width direction. The intake manifold 212 is arranged on the first direction side which is one side in a direction which is perpendicular to the longitudinal direction of the crank shaft 211. That is, the first direction side is one side when the crank shaft 211 is a reference in a planar view. The longitudinal direction of the crank shaft 211 is a direction along a central axis Ax1 of the crank shaft 211. The exhaust manifold 213 is arranged on the second direction side which is the other side in a direction which is perpendicular to the longitudinal direction of the crank shaft 211. In the present embodiment, the first direction side is the front and the second direction side is the rear. Accordingly, the intake manifold 212 is arranged forward of the crank shaft 211 in a planar view of the vehicle. The exhaust manifold 213 is arranged rearward of the crank shaft 211 in a planar view of the vehicle.

A cooling apparatus 25 is arranged between the ventilation space 51 and the engine room 16. The cooling apparatus 25 has a radiator 251 and a fan 252. The radiator 251 cools coolant in the engine 21. The fan 252 generates a flow of air inside the engine room 16. The cooling apparatus 25, the engine 21, the flywheel housing 22, and the hydraulic pump 23 are arranged to line up in the vehicle width direction in this order.

As shown in FIG. 1, a ventilation hole 540 is provided in an outer covering 54 of the work vehicle 100 which opposes the ventilation space 51 and air from outside the work vehicle 100 flows from the ventilation hole 540 into the ventilation space 51. The ventilation space 51 is positioned on the upstream side of the cooling apparatus 25 in the flow of air. That is, the ventilation space 51 is a space on the upstream side of the cooling apparatus 25 in the flow of air. The engine room 16 is a space on the downstream side of the cooling apparatus 25 in the flow of air.

Figure 4:
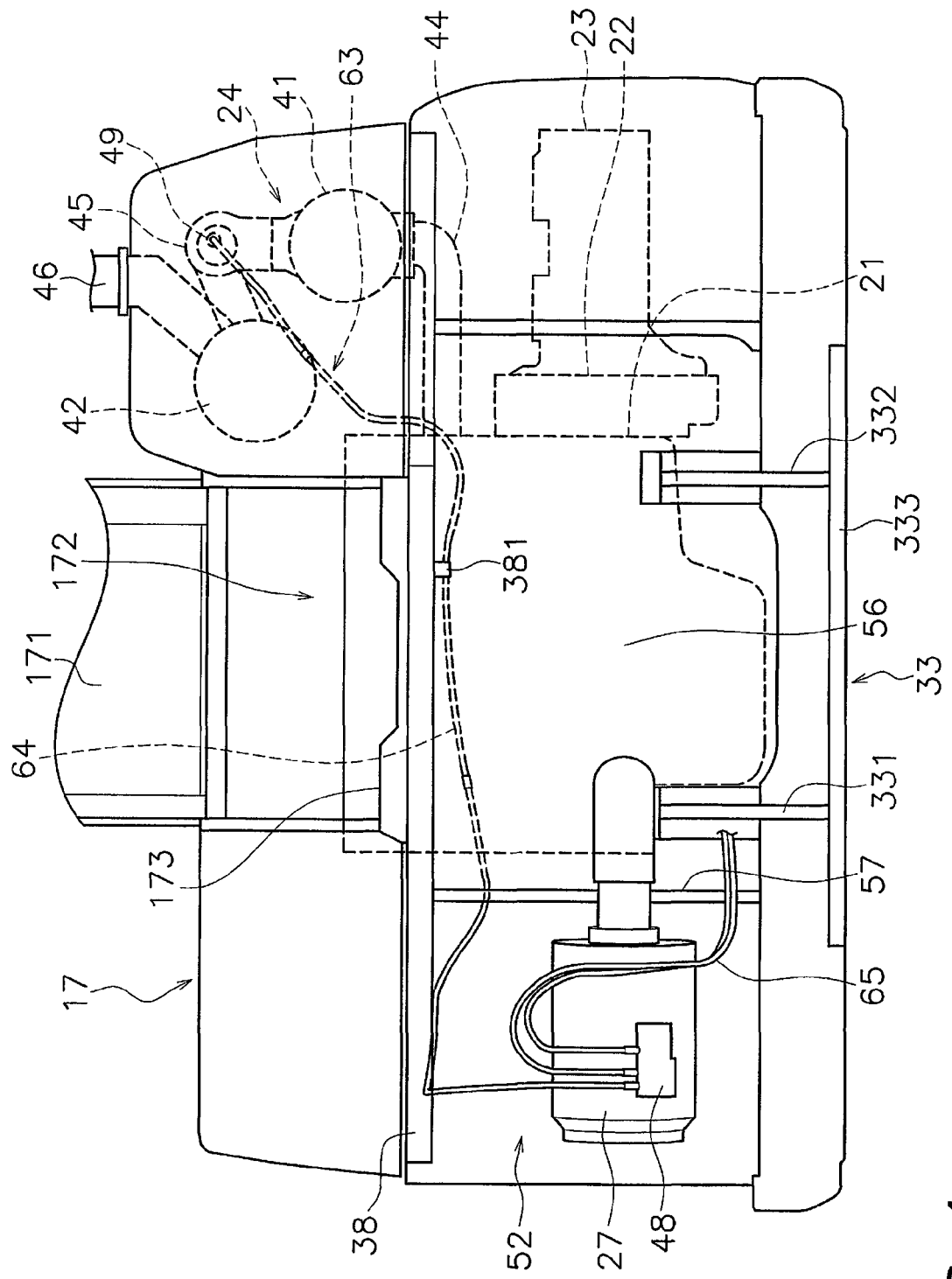
FIG. 4 is a front view of the inner configuration of the work vehicle.

The hydraulic pump 23 is driven by the engine 21. The hydraulic pump 23 is arranged on the side of the engine 21. That is, the hydraulic pump 23 is arranged to line up with the engine 21 in the vehicle width direction. The hydraulic pump 23 is positioned on the opposite side to the engine 21 viewed from the cooling apparatus 25. That is, the engine 21 is positioned between the hydraulic pump 23 and the cooling apparatus 25. FIG. 4 is a front view of the inner configuration of the work vehicle. As shown in FIG. 4, the hydraulic pump 23 is arranged at a position which is lower than the upper surface of the engine 21.

The flywheel housing 22 is arranged between the engine 21 and the hydraulic pump 23. The flywheel housing 22 is attached to the side surface of the engine 21. In addition, the hydraulic pump 23 is attached to the side surface of the flywheel housing 22.

The exhaust treatment apparatus 24 treats exhaust from the engine 21. The exhaust treatment apparatus 24 is arranged above the hydraulic pump 23. At least a portion of the exhaust treatment apparatus 24 is positioned above the engine 21. The exhaust treatment apparatus 24 has a first exhaust treatment apparatus 41 and a second exhaust treatment apparatus 42.

The first exhaust treatment apparatus 41 is an apparatus which treats exhaust from the engine 21. In the present embodiment, the first exhaust treatment apparatus 41 is a diesel particulate filter apparatus which captures particulate matter included in the exhaust using a filter. The first exhaust treatment apparatus 41 burns and incinerates the particulate matter which is captured at an inner section of the first exhaust treatment apparatus 41.

The second exhaust treatment apparatus 42 cleans exhaust from the engine 21 using the reducing agent. In the present embodiment, the second exhaust treatment apparatus 42 is a selective catalytic reduction apparatus which reduces nitrogen oxide NOx using ammonia which is obtained by hydrolysis of a reducing agent such as aqueous urea.

The first exhaust treatment apparatus 41 has an outer shape which is substantially cylindrical. The longitudinal direction of the first exhaust treatment apparatus 41 is arranged along the front and back direction. The second exhaust treatment apparatus 42 has an outer shape which is substantially cylindrical. The longitudinal direction of the second exhaust treatment apparatus 42 is arranged along the front and back direction.

The second exhaust treatment apparatus 42 is arranged between the engine 21 and the first exhaust treatment apparatus 41 in the vehicle width direction. The first exhaust treatment apparatus 41 and the second exhaust treatment apparatus 42 are arranged to be close to each other and are arranged so that the longitudinal directions of the first exhaust treatment apparatus 41 and the second exhaust treatment apparatus 42 are parallel with the front and back direction. The engine 21, the second exhaust treatment apparatus 42, and the first exhaust treatment apparatus 41 are arranged to line up in the vehicle width direction in this order.

As shown in FIG. 4, the engine 21 and the first exhaust treatment apparatus 41 are connected using a first connecting pipe 44. The first connecting pipe 44 extends from the engine 21 in the vehicle width direction. The first exhaust treatment apparatus 41 and the second exhaust treatment apparatus 42 are connected by a second connecting pipe 45. The second connecting pipe 45 is positioned above the first exhaust treatment apparatus 41. The second connecting pipe 45 extends in the front and back direction. A third connecting pipe 46 is connected with the second exhaust treatment apparatus 42. The upper section of the third connecting pipe 46 protrudes upward from the engine hood 17.

A reducing agent injection apparatus 49 is attached to the second connecting pipe 45. The reducing agent injection apparatus 49 injects the reducing agent inside the second connecting pipe 45. The reducing agent which is injected from the reducing agent injection apparatus 49 is mixed with the exhaust inside the second connecting pipe 45 and a gas mixture is supplied to the second exhaust treatment apparatus 42. The reducing agent injection apparatus 49 is arranged on the first direction side with regard to the crank shaft 211. That is, the reducing agent injection apparatus 49 is arranged forward with regard to the longitudinal direction of the crank shaft 211. A guiding pipe 63 for supplying the reducing agent to the reducing agent injection apparatus 49 is connected with the reducing agent injection apparatus 49. The guiding pipe 63 will be described in detail later.

The engine 21, the first connecting pipe 44, the first exhaust treatment apparatus 41, the second connecting pipe 45, the second exhaust treatment apparatus 42, and the third connecting pipe 46 are connected in order in series. Accordingly, exhaust from the engine 21 passes through the first connecting pipe 44 and is fed into the first exhaust treatment apparatus 41. The particulate matter is mostly reduced from the exhaust in the first exhaust treatment apparatus 41. Next, the exhaust passes through the second connecting pipe 45 and is fed into the second exhaust treatment apparatus 42. NOx is mostly reduced in the second exhaust treatment apparatus 42. After this, the cleaned exhaust is discharged to the outside by passing through the third connecting pipe 46 as an exhaust pipe.

As shown in FIG. 3, the first accommodating space 52 and the second accommodating space 53 are partitioned from the engine room 16 using the partition wall 54. The partition wall 54 includes a first wall section 55, a second wall section 56, and a third wall section 57. The first wall section 55 partitions the first accommodating space 52 and the engine room 16. The first wall section 55 extends in the front and back direction in a planar diagram of the vehicle. The second wall section 56 partitions the second accommodating space 53 and the engine room 16. The second wall section 56 extends in the vehicle width direction in a planar view of the vehicle. The third wall section 57 partitions the first accommodating space 52 and the second accommodating space 53. The third wall section 57 extends in the front and back direction in a planar view of the vehicle.

The first accommodating space 52 and the second accommodating space 53 are positioned on the first direction side with regard to the engine room 16. That is, the first accommodating space 52 and the second accommodating space 53 are positioned forward of the engine room 16. The first accommodating space 52 and the second accommodating space 53 are lined up in the vehicle width direction. In the present embodiment, the first accommodating space 52 is positioned on the right of the second accommodating space 53. The engine room 16 and the second accommodating space 53 are lined up in the front and back direction.

The work vehicle 100 is provided with an air cleaner 27 which cleans air which is supplied to the engine 21. The air cleaner 27 is arranged in the first accommodating space 52. The first accommodating space 52 is positioned behind the fuel tank 14. The first accommodating space 52 is communicated with the ventilation space 51. Accordingly, the first accommodating space 52 is communicated with a space on the outside of the vehicle body 1 via the ventilation space 51. A control valve 28 is arranged in the second accommodating space 53. The control valve 28 controls the flow amount and the flow direction of the hydraulic fluid which is supplied to each of the hydraulic cylinders 10 to 12 in the work implement 4.

The work vehicle 100 has a main frame section 33. The main frame section 33 extends in the front and back direction. The main frame section 33 is arranged below the engine 21 and supports the engine 21. The engine 21 is arranged on the rear section of the main frame section 33. The main frame section 33 has a right main frame 331 and a left main frame 332.

The right main frame 331 and the left main frame 332 are arranged to be spaced from each other in the vehicle width direction. The right main frame 331 and the left main frame 332 are members with plate shapes which extend respectively in the front and back direction and the up and down direction. In addition, the main frame section 33 has a bottom plate 333. The right main frame 331 and the left main frame 332 are joined by the bottom plate 333. The first accommodating space 52 described above is positioned on the right of the right main frame 331. The second accommodating space 53 is positioned between the right main frame 331 and the left main frame 332.

As shown in FIG. 3, the work vehicle 100 has a first frame member 38 and a second frame member 39. The first frame member 38 and the second frame member 39 each extend in the vehicle width direction. The first frame member 38 and the second frame member 39 are arranged to be spaced from each other in the front and back direction. The first frame member 38 is positioned forward of the second frame member 39. The first frame member 38 and the second frame member 39 are positioned above the main frame section 33 and are supported by a plurality of column members (which are not shown in the diagram) which are erected on a revolving frame 31. The exhaust treatment apparatus 24 described above is supported by the first frame member 38 and the second frame member 39. The first frame member 38 is positioned above the second wall section 56 and arranged along the second wall section 56.

As shown in FIG. 4, the engine hood 17 includes a cover section 171. The cover section 171 is configured to open and close an opening 172 which is positioned above the engine room 16. The first frame member 38 is arranged along an edge of the opening 172 in a state where the cover section 171 is opened. The first frame member 38 supports a front edge of the engine hood 17. In addition, the first frame member 38 supports the front edge of the cover section 171. Here, the edge of the opening 172 in the present embodiment is configured by a member 173 which is arranged above the first frame member 38, but the edge of the opening 172 may be configured by the first frame member 38 without the member 173 being provided.

Next, the arrangement of the guiding pipe 63 for supplying the reducing agent to the reducing agent injection apparatus 49 will be described. The guiding pipe 63 has a first guiding pipe 64 and a second guiding pipe 65. The first guiding pipe 64 connects the reducing agent injection apparatus 49 and a reducing agent pump 48. The first guiding pipe 64 guides the reducing agent from the reducing agent pump 48 to the reducing agent injection apparatus 49. The second guiding pipe 65 connects the reducing agent pump 48 and a reducing agent tank 47. The second guiding pipe 65 guides the reducing agent from the reducing agent tank 47 to the reducing agent pump 48.

The reducing agent tank 47 (refer to FIG. 3) retains the reducing agent which is supplied to the second exhaust treatment apparatus 42. The reducing agent pump 48 discharges the reducing agent. The reducing agent pump 48 sucks the reducing agent from the reducing agent tank 47 via the second guiding pipe 65 and supplies the reducing agent to the reducing agent injection apparatus 49 via the first guiding pipe 64.

The reducing agent tank 47 and the reducing agent pump 48 are arranged outside of the engine room 16. The reducing agent tank 47 is arranged in front of the fuel tank 14. The reducing agent pump 48 is arranged behind the fuel tank 14. The reducing agent pump 48 is arranged in the first accommodating space 52. The reducing agent pump 48 is arranged on one lateral side of the main frame section 33 and the reducing agent injection apparatus 49 is arranged on the other lateral side of the main frame section 33. In the present embodiment, the reducing agent pump 48 is arranged on the right of the main frame section 33 and the reducing agent injection apparatus 49 is arranged on the left of the main frame section 33. The control valve 28 described above is arranged between the reducing agent pump 48 and the reducing agent injection apparatus 49 in a direction which is parallel with the longitudinal direction of the crank shaft 211, that is, the vehicle width direction.

The first guiding pipe 64 is arranged so as to pass inside the engine room 16 on the first direction side with regard to the crank shaft 211. The first guiding pipe 64 is arranged inside the engine room 16 so as to pass between the partition wall 54 and the engine 21. In detail, the first guiding pipe 64 is arranged so as to pass inside the engine room 16 between the second wall section 56 and the engine 21 and is arranged so as to extend in the vehicle width direction along the second wall section 56.

As shown in FIG. 4, the first guiding pipe 64 is arranged so as to pass above the left main frame 332 and the right main frame 331. In detail, the lowest portion of the first guiding pipe 64 between the left main frame 332 and the right main frame 331 is positioned above the left main frame 332 and the right main frame 331. The first frame member 38 has a bracket 381 which holds the first guiding pipe 64. The first guiding pipe 64 is supported by the first frame member 38 using the bracket 381 and arranged along the first frame member 38. Accordingly, in a state where the cover section 171 of the engine hood 17 is open, the first guiding pipe 64 is arranged along the opening 172 below the opening 172. The first guiding pipe 64 is arranged so as to pass through a through hole which is provided in the first wall section 55 and is arranged to span across the engine room 16 and the first accommodating space 52. The first guiding pipe 64 is connected with the reducing agent pump 48 inside the first accommodating space 52. The first guiding pipe 64 is connected with the reducing agent injection apparatus 49 inside the engine room 16.

The second guiding pipe 65 extends from the reducing agent tank 47 along the main frame section 33 on the outer lateral side of the main frame section 33 and is connected with the reducing agent pump 48 in the first accommodating space 52. The second guiding pipe 65 is arranged so as to pass between the main frame section 33 and the fuel tank 14.

The work vehicle 100 according to the present embodiment has the following characteristics.

The reducing agent injection apparatus 49 is arranged on the first direction side with regard to the crank shaft 211 and the reducing agent pump 48 is arranged inside the first accommodating space 52 which is positioned on the first direction side with regard to the engine room 16. That is, the reducing agent injection apparatus 49 and the reducing agent pump 48 are both positioned forward with regard to the longitudinal direction of the crank shaft 211. As a result, it is possible to shorten the first guiding pipe 64 which connects the reducing agent injection apparatus 49 and the reducing agent pump 48. Due to this, it is possible to reduce the effect of heat on the reducing agent inside the first guiding pipe 64.

In addition, the temperature of the space on the first direction side inside the engine room 16, that is, the space on the intake side is lower than the temperature of the space on the second direction side, that is, the space on the exhaust side. For example, the temperature of the space on the intake side is from approximately 70° C. to 75° C. while the temperature of the space of the exhaust side is approximately 90° C. In addition, when the aqueous urea which is used as the reducing agent is maintained at a temperature of approximately 80° C. or more, the decomposition proceeds in a short time. As a result, it is possible to further reduce the effect of heat on the reducing agent inside the first guiding pipe 64 by the first guiding pipe 64 being arranged in the space inside the engine room 16 on the intake side.

In addition, the temperature in the vicinity of the control valve 28 is higher than the temperature of the space inside the engine room 16 on the intake side. For example, the temperature in the vicinity of the control valve 28 is from approximately 80° C. to 85° C. while the temperature of the space inside the engine room 16 on the intake side is approximately from 70° C. to 75° C. As a result, by arranging the first-guiding pipe 64 so as to pass through the space inside the engine room 16 on the intake side rather than being arranged so as to pass through the second accommodating space 53, it is possible to reduce the effect of heat due to the control valve 28 on the reducing agent inside the first guiding pipe 64.

The first guiding pipe 64 is arranged along the opening 172 below the opening 172 in a state where the cover section 171 of the engine hood 17 is open. As a result, it is possible to suppress the first guiding pipe 64 from becoming an obstacle when attaching and detaching the engine 21 to and from the vehicle body 1 via the opening 172. In addition, since it is possible to easily access the first guiding pipe 64 via the opening 172, the ease of maintaining the first guiding pipe 64 is improved.

The reducing agent pump 48 is arranged on the right of the main frame section 33 and the reducing agent injection apparatus 49 is arranged on the left of the main frame section 33. In this case, the length of first guiding pipe 64 is lengthened, compared to a case where reducing agent pump 48 and the reducing agent injection apparatus 49 are arranged on the same side with regard to the main frame section 33. However, since the first guiding pipe 64 in the work vehicle 100 according to the present embodiment is arranged so as to pass through the space inside the engine room 16 on the intake side, it is possible to reduce the effect of heat on the reducing agent inside the first guiding pipe 64.

The first guiding pipe 64 is arranged so as to pass above the left main frame 332 and the right main frame 331. As a result, since the main frame does not easily become an obstacle in the layout of the first guiding pipe 64, it is possible to easily realize the layout of the first guiding pipe 64 with little bending. Due to this, it is possible to reduce the reducing agent which remains inside the first guiding pipe 64 when the reducing agent pump 48 is stopped.

An embodiment of the present invention is described above, but the present invention is not limited to the embodiment described above and various types of modifications are possible in a scope which does not depart from the gist of the invention.

The work vehicle is not limited to a hydraulic excavator and may be another vehicle such as a wheel loader, a motor grader, or a bulldozer.

The configuration of the exhaust treatment unit is not limited to the configuration described above. For example, the second exhaust treatment apparatus 42 may be an apparatus which uses a reducing agent which is different from aqueous urea. The first exhaust treatment apparatus 41 may be a treatment apparatus which is different from a diesel particulate filter apparatus. The first exhaust treatment apparatus 41 and the second exhaust treatment apparatus 42 may be arranged at positions which are different from the positions described above. The first exhaust treatment apparatus 41 is not limited to being a cylindrical shape or the like and may be another shape such as an elliptical shape or a rectangular shape. The second exhaust treatment apparatus 42 is not limited to being a cylindrical shape or the like and may be another shape such as an elliptical shape or a rectangular shape. The connecting pipes 44, 45, and 46 may be arranged at positions which are different from the positions described above. For example, the second connecting pipe 45 may be arranged below the first exhaust treatment apparatus 41.

In the embodiment described above, the crank shaft 211 extends in the vehicle width direction, but the crank shaft 211 may extend in the front and back direction. Alternatively, in contrast to the embodiment described above, the first direction side may be the rear side with regard to the longitudinal direction of the crank shaft 211 and the second direction side may be the front side with regard to the longitudinal direction of the crank shaft 211.

The arrangement of the guiding pipe 63 is not limited to the arrangement in the embodiment described above. For example, the first guiding pipe 64 may be arranged on the second direction side with regard to the crank shaft 211. The first guiding pipe 64 may be arranged so as to pass through the second accommodating space 53.

According to the present invention, it is possible to provide a work vehicle where it is possible to reduce the effect of heat on a reducing agent inside a guiding pipe.

The invention claimed is:
1. A work vehicle comprising:
a vehicle body having an engine room and a first accommodating space partitioned from the engine room;
an engine having a crank shaft, an intake manifold arranged on a first direction side of the crank shaft, and an exhaust manifold arranged on a second direction side of the crank shaft, the first direction side of the crank shaft being a first side along a direction perpendicular to a longitudinal direction of the crank shaft, and the second direction side of the crank shaft being on a second side opposite to the first side along the direction perpendicular to the longitudinal direction of the crank shaft;
an exhaust treatment apparatus configured to clean exhaust from the engine with a reducing agent;
a connecting pipe connected to the exhaust treatment apparatus, the connecting pipe being configured to conduct exhaust from the engine to the exhaust treatment apparatus;
a reducing agent injection apparatus arranged on the first direction side of the crank shaft, the reducing agent injection apparatus being configured to inject the reducing agent inside the connecting pipe;
a reducing agent pump configured to discharge the reducing agent; and
a guiding pipe configured to guide the reducing agent from the reducing agent pump to the reducing agent injection apparatus,
the engine and the reducing agent injection apparatus being arranged inside the engine room,
the first accommodating space being positioned on a side of the engine room adjacent the first direction side of the crank shaft,
the reducing agent pump being arranged inside the first accommodating space,
a temperature of the first accommodating space being lower than a temperature of the engine room,
the engine room having a space on an exhaust side and a space on an intake side, the exhaust side space being on the second direction side of the crank shaft, the intake side space being on the first direction side of the crank shaft, and
the guiding pipe being arranged to pass inside the intake side space of the engine room.

2. The work vehicle according to claim 1, further comprising:
a hydraulic pump driven by the engine;
a work implement driven by hydraulic fluid discharged from the hydraulic pump;
a control valve configured to control the hydraulic fluid supplied to the work implement; and
a partition wall configured to partition a second accommodating space and the engine room, the second accommodating space being arranged on the side of the engine room adjacent the first direction side of the crank shaft,
the control valve being arranged inside the second accommodating space, and
the guiding pipe being arranged so as to pass inside the engine room between the partition wall and the engine.

3. The work vehicle according to claim 2, wherein
the control valve is arranged between the reducing agent pump and the reducing agent injection apparatus along a direction parallel to the longitudinal direction of the crank shaft.

4. The work vehicle according to claim 1, wherein
the vehicle body has an engine hood configured to open and close an opening positioned above the engine room, and a frame member supporting an end portion of the engine hood, and
the frame member has a bracket holding the guiding pipe.

5. The work vehicle according to claim 1, further comprising:
a main frame section arranged below the engine, the main frame section supporting the engine,
the main frame section having a left main frame and a right main frame, each of the left main frame and the right main frame being arranged so as to extend in a front and back direction,
the crank shaft being arranged so as to extend in a vehicle width direction,
the reducing agent pump being arranged on a first lateral side of the main frame section, and
the reducing agent injection apparatus being arranged on a second lateral side of the main frame section opposite to the first lateral side.

6. The work vehicle according to claim 5, wherein
the guiding pipe is arranged so as to pass above the left main frame and the right main frame, and
a lowest portion of the guiding pipe between the left main frame and the right main frame is positioned above the left main frame and the right main frame.

7. The work vehicle according to claim 2, wherein
the vehicle body has an engine hood configured to open and close an opening positioned above the engine room, and a frame member supporting an end portion of the engine hood, and
the frame member has a bracket holding the guiding pipe.

8. The work vehicle according to claim 2, further comprising:
a main frame section arranged below the engine, the main frame section supporting the engine,
the main frame section having a left main frame and a right main frame, each of the left main frame and the right main frame being arranged so as to extend in a front and back direction,
the crank shaft being arranged so as to extend in a vehicle width direction,
the reducing agent pump being arranged on a first lateral side of the main frame section, and
the reducing agent injection apparatus being arranged on a second lateral side of the main frame section opposite to the first lateral side.

9. The work vehicle according to claim 8, wherein
the guiding pipe is arranged so as to pass above the left main frame and the right main frame, and
a lowest portion of the guiding pipe between the left main frame and the right main frame is positioned above the left main frame and the right main frame.

10. The work vehicle according to claim 3, wherein
the vehicle body has an engine hood configured to open and close an opening positioned above the engine room, and a frame member supporting an end portion of the engine hood, and
the frame member has a bracket holding the guiding pipe.

11. The work vehicle according to claim 3, further comprising:
a main frame section arranged below the engine, the main frame section supporting the engine,
the main frame section having a left main frame and a right main frame, each of the left main frame and the right main frame being arranged so as to extend in a front and back direction,
the crank shaft being arranged so as to extend in a vehicle width direction,
the reducing agent pump being arranged on a first lateral side of the main frame section, and
the reducing agent injection apparatus being arranged on a second lateral side of the main frame section opposite to the first lateral side.

12. The work vehicle according to claim 11, wherein
the guiding pipe is arranged so as to pass above the left main frame and the right main frame, and
a lowest portion of the guiding pipe between the left main frame and the right main frame is positioned above the left main frame and the right main frame.

13. The work vehicle according to claim 4, further comprising:
- a main frame section arranged below the engine, the main frame section supporting the engine,
- the main frame section having a left main frame and a right main frame, each of the left main frame and the right main frame being arranged so as to extend in a front and back direction,
- the crank shaft being arranged so as to extend in a vehicle width direction,
- the reducing agent pump being arranged on a first lateral side of the main frame section, and
- the reducing agent injection apparatus being arranged on a second lateral side of the main frame section opposite to the first lateral side.

14. The work vehicle according to claim 13, wherein
the guiding pipe is arranged so as to pass above the left main frame and the right main frame, and
a lowest portion of the guiding pipe between the left main frame and the right main frame is positioned above the left main frame and the right main frame.

* * * * *